United States Patent [19]

Zimmerer, deceased et al.

[11] 4,219,043
[45] Aug. 26, 1980

[54] CONTINUOUS-FEED FLUID SUPPLY APPARATUS

[75] Inventors: Arthur L. Zimmerer, deceased, late of Lindsay, Nebr., by Bernadette Zimmerer, joint executor; by First National Bank and Trust Co., joint executor, Columbus, Nebr.; David A. Siekmeier; Glen L. Andersen, both of Columbus, Nebr.; Charles H. Meis, Albion, Nebr.

[73] Assignee: Lindsay Manufacturing Company, Lindsay, Nebr.

[21] Appl. No.: 947,038

[22] Filed: Sep. 29, 1978

[51] Int. Cl.² ............................................. F16L 27/00
[52] U.S. Cl. .................................. 137/312; 137/899.1; 137/580; 239/183; 239/709
[58] Field of Search ..................... 137/312, 344, 580; 239/183, 212

[56] References Cited

U.S. PATENT DOCUMENTS

| | | |
|---|---|---|
| 2,798,506 | 7/1957 | Baker et al. |
| 2,974,876 | 3/1961 | Poynor et al. |
| 3,011,502 | 12/1961 | Jordan ................................ 137/580 |
| 3,019,813 | 2/1962 | Dommann |
| 3,268,174 | 8/1966 | Boone |
| 3,281,080 | 10/1966 | Hogg |
| 3,349,794 | 10/1967 | Behlen |
| 3,444,941 | 5/1969 | Purtell |
| 3,447,751 | 6/1969 | Wieck |
| 3,592,220 | 7/1971 | Reinke |
| 3,608,825 | 9/1971 | Reinke |
| 3,903,917 | 9/1975 | Ede |

Primary Examiner—Gerald A. Michalsky
Attorney, Agent, or Firm—Kinzer, Plyer, Dorn & McEachran

[57] ABSTRACT

An apparatus for supplying water or other fluids from a stationary pipe to a moving pipe. The stationary supply conduit has a seam which can be opened and closed somewhat in the fashion of a zipper. An extractor is located inside the supply conduit and has a riser portion which protrudes through an opening in the seam. The extractor is moveable along the length of the supply conduit. Seam opening means create an aperture as the riser approaches while closing means are provided to refasten the seam after the riser has passed. Fluid seals isolate the seam opening from the fluid being carried. The extractor rides on spherical rollers and can include an evacuator tube which removes any water seeping through the seals.

5 Claims, 9 Drawing Figures

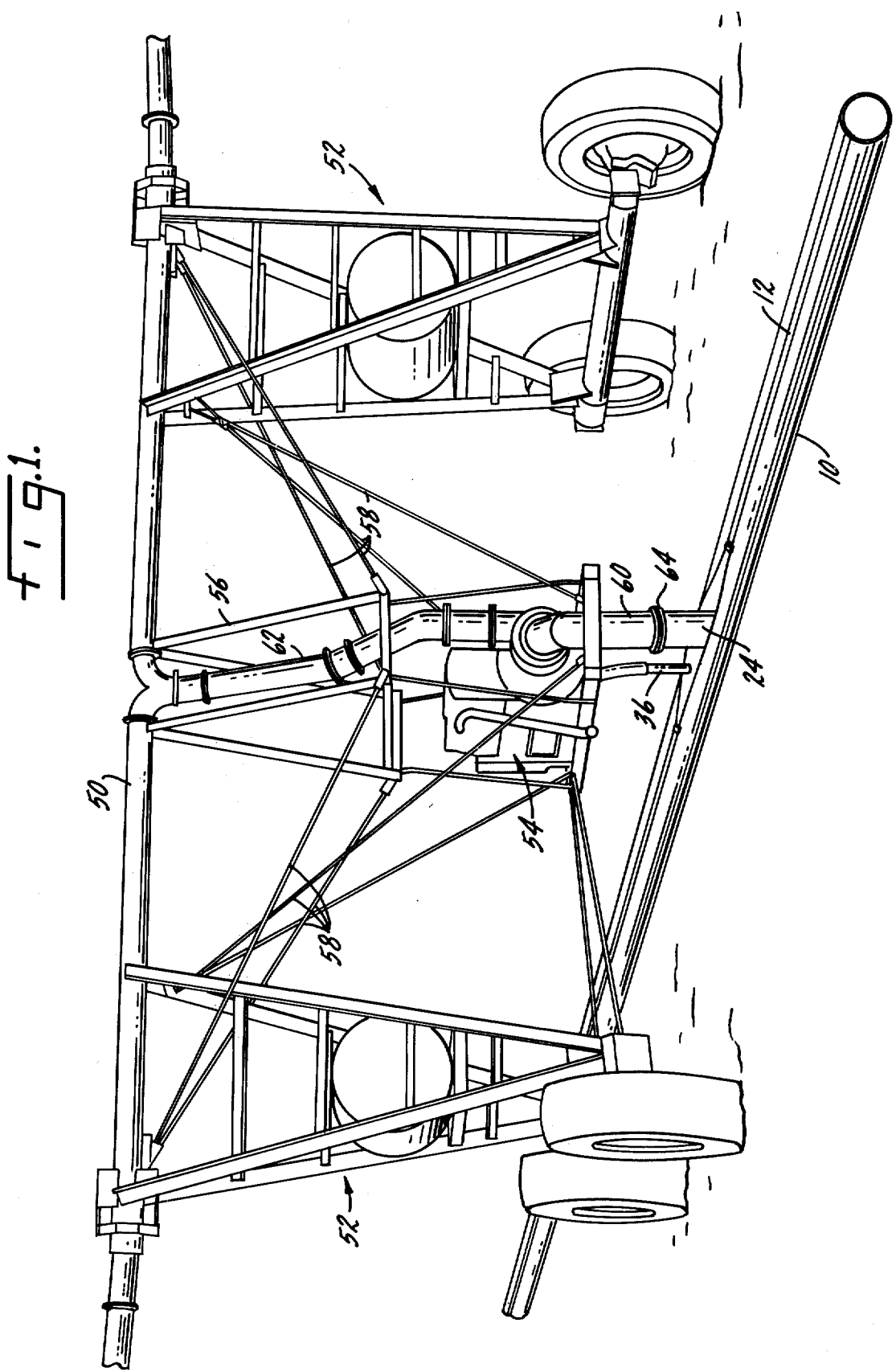

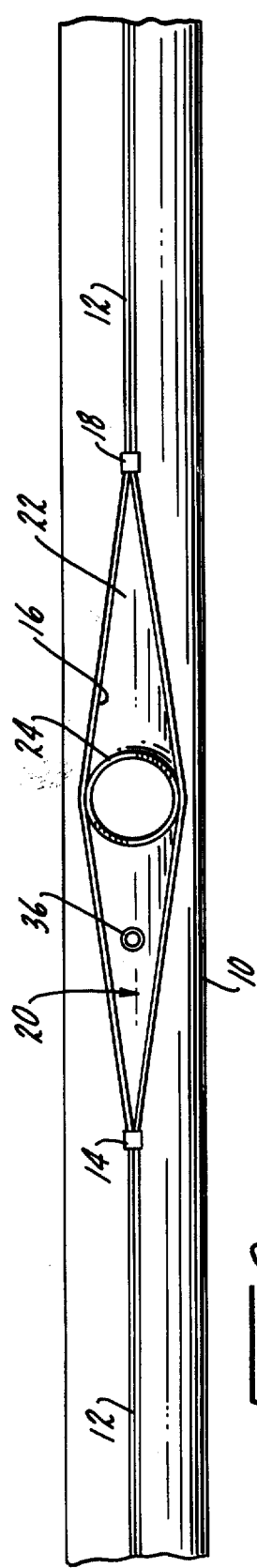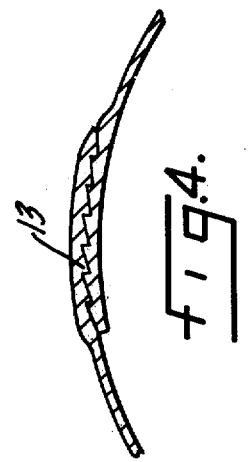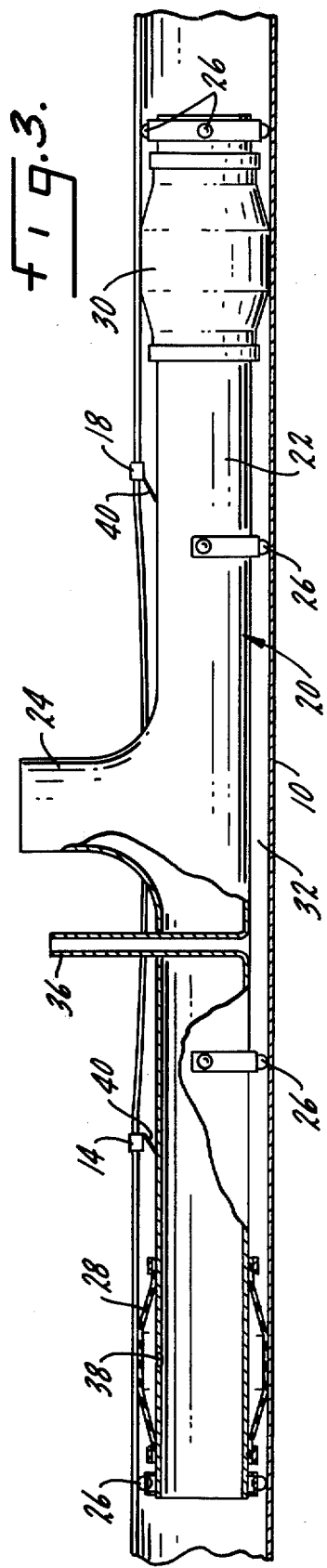

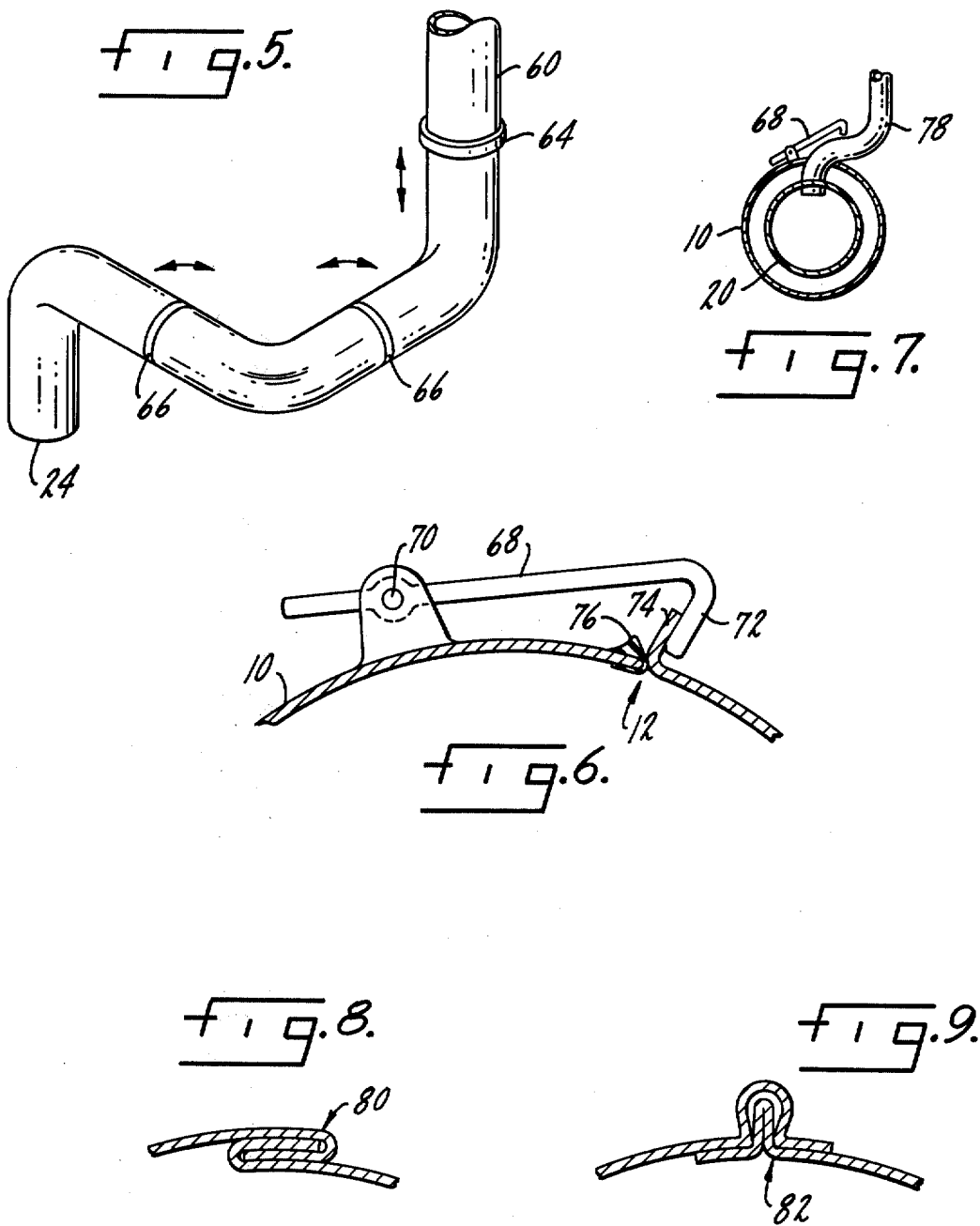

4,219,043

CONTINUOUS-FEED FLUID SUPPLY APPARATUS

BACKGROUND OF THE INVENTION

This invention relates to a water supply system and is particularly useful in conjunction with agricultural irrigation units.

A basic problem with mobile agricultural irrigation units is supplying the moving sprinkler pipe with water. One well known solution is to have one end of an irrigation system fixed while the rest of the pipe rotates about that point. Water is then supplied to the pivot point. These so-called center-pivot systems are inefficient in that they fail to irrigate the corners of the square circumscribed about their circular path. This problem can be avoided by use of a system which moves laterally to the length of the sprinkler pipe. The so-called lateral move systems conform nicely to the shape of most agricultural fields but present a problem of supplying them with water.

Various schemes have been devised to meet this difficulty. Among these are: an open channel or ditch running perpendicular to the sprinkler pipe; a closed supply pipe with valves or spigots located at intervals; providing a flexible supply hose which is paid out or reeled in as necessary to connect the sprinkler pipe to a water source. These all have disadvantages of one sort or another. The open channels can be used only on very flat ground. The spaced valve arrangement requires either periodic inputs of manual labor or complex valve changing apparatus, thus making it less suitable for automatic operation. The flexible hose arrangement is feasible only for small fields as the weight and size of the hose and reel combination becomes prohibitive for larger fields.

There have been attempts to solve the problem by providing a pipe which opens along a seam for feeding into a moving pipe. See Boone U.S. Pat. No. 3,268,174 and Reinke U.S. Pat. No. 3,592,220. These arrangements have the difficulty of requiring a seal, between the moving pipe and supply pipe, which extends along the entire length of the supply pipe. Also, they permit only a minimal flow because the sealing arrangement between the moving pipe and the stationary pipe allows only a very small opening. This limitation is caused by the fact that some element of the moving pipe must penetrate the primary seal means to provide fluid communication between the stationary pipe and the conduit connected to the moving pipe.

SUMMARY OF THE INVENTION

A primary object of this invention is an improved apparatus for continuously supplying fluid from a stationary pipe to a moving pipe.

Another object is improved fluid-flow obtained by eliminating constrictions and obstructions in the flow path thereby reducing the resistance to fluid-flow.

Another object is a fluid-supply apparatus wherein the sealing means is remote from the aperture in the main supply pipe.

Another object is a seal arrangement wherein no element penetrates the primary water seal.

Another object is a sealing arrangement which permits opening the supply at a point where it is not subject to the normal fluid pressure in the pipe.

Another object is the removal of any fluid leaking past the seals by use of an evacuator tube.

Another object is the elimination of a need to provide a seal along the entire length of the stationary supply pipe.

Another object is the reduction of the drag or resistance to motion of the moving pipe.

Another object is a stationary supply pipe wherein the opening and closing of that pipe requires positive action and does not rely on seal resilience to reclose the opening.

Accordingly, the invention is directed to a mobile, continuous-feed fluid supply apparatus having a main supply conduit, a moving takeoff pipe in fluid communication with the inside of the supply conduit, and means for sealing the connection between the two conduits. The main supply conduit has a continuous longitudinal seam which can be opened and reclosed at any point therealong. The takeoff pipe or riser and the sealing means form an integral T-shaped extractor. The sealing portion of the extractor is a generally cylindrical tube, concentric with the main supply conduit and located inside the conduit. The riser portion extends through a movable aperture formed in the conduit seam, thus providing a conduit-tapping connection point. The extractor is movable along the entire length of the seam. Means are provided for opening the seam ahead of the riser portion as the extractor moves through the conduit. There are also closure means for reclosing the seam after the passage of the riser. These opening and closing means may operate in the fashion of a zipper although the seam need not necessarily have the toothed configuration of a normal zipper. First and second fluid seals are provided on either side of the aperture, between the extractor and the main conduit. An evacuator tube removes any seepage of fluid through the seals.

BRIEF DESCRIPTION OF THE DRAWINGS

FIG. 1 is a perspective view of a portion of a linear move irrigation machine with the fluid supply apparatus of the present invention;

FIG. 2 is a plan view of the fluid supply apparatus;

FIG. 3 is a side view of the apparatus in parallel cross-section;

FIG. 4 shows an alternate configuration of a main supply conduit closure;

FIG. 5 is a perspective view of a variation of a flexible connection pipe between the main supply conduit and an irrigation unit;

FIG. 6 is a view, longitudinal to the main supply conduit, of an alternate embodiment of a main supply conduit closure;

FIG. 7 shows a variation of a take-off pipe that could be used with the closure arrangement of FIG. 6; and FIGS. 8 and 9 are views of alternate main supply conduit seam configurations.

DESCRIPTION OF THE PREFERRED EMBODIMENT

A linear move agricultural irrigation unit is shown in FIG. 1. A main supply conduit 10 supplies water to the unit. The conduit has a continuous longitudinal seam 12 through which water is extracted for distribution. The irrigation unit comprises a sprinkler pipe 50 supported at intervals by wheeled towers 52. The towers are self-propelled to carry the sprinkler pipe 50 in the direction of supply conduit 10. The unit shown also includes a power pack 54 supported by a sling 56 and rods 58. The power pack has an engine for driving a booster pump. The pump inlet is connected to the supply conduit through intake pipe 60. Pressurized water is fed to the sprinkler pipe 50 through feed pipe 62. The intake pipe 60 must be capable of flexing vertically and transversely to the conduit 12. This can be achieved through use of telescoping joint 64. An alternate method for providing the required flexibility is the triple elbow arrangement of FIG. 5. This has short pipe segments extending in three orthogonal planes with swivel joints 66 in each segment. It will be understood that the fluid supply apparatus can be used without the power pack arrangement shown. Nor is the fluid supply apparatus of the present invention limited to use with an irrigation system having a traveling sprinkler pipe. For example, the apparatus could supply water to a traveling gun which would distribute it as a high pressure spray, rather than using a sprinkler pipe. In fact, the present invention could be used in applications other than irrigation.

The continuous feed fluid supply apparatus is shown in FIGS. 2 and 3. The overall concept of the invention is to have a main supply conduit which can be tapped at any point along its length. The moving, supplied pipe can then connect to a takeoff pipe which is always in fluid communication with the main supply conduit as it moves along the length of that conduit.

Only a portion of the main supply conduit 10 is shown in the drawings. In the agricultural irrigation application contemplated for this invention, the main supply conduit 10 lies on the ground and extends the length of the field to be irrigated. The conduit lies in the direction of travel of a lateral move irrigation system. Such a system with its traveling sprinkler pipe arrayed perpendicularly to the main supply conduit has an intake pipe connected to the supply pipe 10. Motion of the lateral move irrigation system causes this connection point to move along the length of the main supply conduit.

To permit this connection, the conduit 10 has a continuous longitudinal seam 12 located on its top surface. The seam can be opened and closed at any point. When closed, it provides a watertight seam so that the conduit can convey water under pressure the same as any conventional pipe. The seam can be a conventional zipper, a stovepipe type seam or a lap type seam as described hereinafter. Another possible configuration is the closure described in Ausnit U.S. Pat. No. 3,918,131. Still another closure is shown in FIG. 4. This closure has magnetic particles embedded in the parent material to hold the inter-locking teeth 13 together.

Where the main conduit 10 is to be tapped, an opening means or slider 14 separates the portions of the seam 12 which can then be spread apart to form an aperture 16. As the sprinkler pipe moves, say, to the left in FIGS. 2 and 3, the location of the tap will need to move with it. The aperture location slides along the pipe 10 to permit this. The opening means 14 operates in conjunction with a closing means or slider 18 which refastens the portions of the seams together after the aperture is no longer required at a particular point and has been moved on down the main supply conduit 10.

An extractor 20 is the connecting piece between the intake pipe 60 of the irrigation system and the main supply conduit 10. The extractor includes a generally cylindrical body portion 22 which fits inside the main conduit and is movable along the conduit length. The take-off conduit or riser portion of the extractor is shown at 24. In a preferred embodiment, this will be integral with the body 22 of the extractor. The riser extends through the aperture 16 in the top of the conduit as best shown in FIG. 2. Spherical rollers 16 are placed around the extractor body 22 to facilitate sliding of the extractor 20 through the conduit 10. Flexible fluid seals 28 and 30 are located toward the ends of the extractor body 22. These seals engage the inside wall of the conduit 10 and prevent water from leaking between the extractor body 22 and the conduit wall.

Between the seals and on the outside of the extractor there is an open or isolated space 32. Essentially no water is allowed to enter the isolated space 32. The extractor body 22 together with seals 28 and 30 comprise means for isolating the aperture 16 from the fluid carried by supply conduit 10. Any water that seeps through the seals into this area is removed through an evacuator tube 36 which is connected to an external suction pump (not shown).

The fluid seals 28 and 30 are designed to be pressurized through ports 38. This means the seals are pressurized by the same fluid they are sealing, as the water pressure through ports 38 urges the seals into engagement with the conduit wall. This permits the sealing force to be proportional to the fluid pressure within the conduit, thus protecting the conduit from local overload due to excessive seal force.

It will be noted that the seam opening and closing means 14 and 18 are both located between the seals 28 and 30. So the conduit seam 12 will be opened into aperture 16 only at a point above the isolated space 32. Thus, no pressurized water is exposed to the aperture 16. This means there is no need to seal the conduit 10 about the riser portion or takeoff tube 24. This, in turn, permits the riser to have any shape and size required for optimum fluid flow. The sealing is accomplished at a point remote from the takeoff tube so there is no need to constrict that tube to facilitate sealing it.

The extractor body 22 can have any length required to make an isolated space 32 which permits a large aperture 16. That is, the opening and closing means or sliders 14 and 18 can be spaced sufficiently far apart so that the seam 12 opens gradually at the sliders, eventually widening sufficiently to accommodate the riser portion 24. Where the conduit 10 is on hilly terrain, the extractor length may be shortened to permit passage of the extractor through vertical curves. In such a case the riser 24 can be narrowed to more readily fit a foreshortened aperture 16 and prevent abrupt changes in the aperture width.

The pipe seam 12 requires positive seam opening and closing. Once the seam has been opened, it will remain open until a subsequent slider passes by to refasten the seam back together. This eliminates the reliance on seam resilience to effect the closing thereof. Use of the positive opening and closing sliders permits design of more effective seams.

It will be noted that among the advantages of the present invention is that it is completely reversible. When the extractor reaches one end of the conduit, no special measures are needed to prepare it for traveling back in the opposite direction. The opening and closing means or sliders 14 and 18 will simply trade functions, much like a slider on a zipper. Each slider 14 and 18 will perform either the opening or closing function depending on which direction the extractor 20 is moving. The sliders are connected to the extractor body 22 by tabs 40 in a preferred embodiment. An alternate arrangement would be an external harness connecting the sliders 14 and 18 to riser 24.

Another advantage of having the extractor on the inside of the main supply conduit and sealing on the inside is that it protects the seals from dirt and corrosion that may collect on the outside walls of the conduit. This allows a more effective seal. In addition, should any repairing or patching be required on the supply conduit 10, it can be done on the outside and need not be finished to a smooth surface as would be required if external sealing were used.

Internal sealing also has the advantage of eliminating the need for a seal extending the length of the pipe. Instead, two individual seals 28 and 30 are all that are required. These can be readily replaced should they become worn. Internal sealing also minimizes the resistance to motion. Finally, it will be noted that no element penetrates the water seals. This increases seal life and minimizes leakage.

The main supply conduit 10 could be made of steel, aluminum, a synthetic material of some type or other suitable material. A particularly advantageous embodiment is that shown in FIGS. 6 and 7. This version of the supply conduit could be roll-formed in the field, avoiding the need to weld pipe joints out there. A flat ribbon of material on a spool could be taken to the field and roll-formed there.

FIG. 6 also shows an alternate supply conduit seam arrangement. This uses a plurality of latches or clamps 68 spaced along the conduit. The latches are mounted as at 70 with a hook or projection 72 engaging a flange 74 of seam 12. A resilient edge liner 76 could be included to effect a tighter seal. The clamp opening and closing means for this hookup would require the external harness-type mounting referred to above. A special riser pipe 78 (FIG. 7) can be provided with a curved shape that allows it to clear the open latches as it passes by.

FIGS. 8 and 9 show alternate configurations for seam 12. Both the stove pipe seam 80, FIG. 8, and the crimped-end type seam 82, FIG. 9, can be formed in metallic sheet material and could include embedded magnetic particles to enhance their holding ability.

What is claimed is:

1. In a continuous-feed fluid supply apparatus usable with a linear moving irrigation system for supplying water thereto, a main supply conduit having a generally continuous longitudinal seam therein which can be opened and closed on a control basis, an extractor located in the conduit and movable along the length thereof, the extractor including an elongated intake positioned inside of the conduit opened at each end and a riser extending outwardly from the intake intermediate the ends thereof through an opening in the conduit caused by opening the seam, means for opening the seam ahead of and for closing it after the riser thereby creating an opening of limited longitudinal extent, seals at each end of the intake for preventing the admission of water into the space between the outside of the intake and the inside of the conduit which might otherwise leak through the open seam around the riser, and an evacuator mounted on and movable with the extractor and communicating with the space between the outside of the intake and the inside of the conduit for removing any water that leaks past the seal so as to prevent water from being spilled on the ground alongside the main supply conduit through the opening created in the conduit seam for the riser.

2. The structure of claim 1 in which the evacuator includes a pipe connected to a source of vacuum and opening into the space below the intake inside of the main conduit and between the seals.

3. The structure of claim 2 further characterized in that the pipe extends down through the intake and opens on the bottom side thereof.

4. The structure of claim 1 further characterized by and including longitudinally spaced guide rollers between the outside of the intake and the inside of the main supply conduit to facilitate sliding of the extractor in the supply conduit.

5. The structure of claim 4 further characterized in that the rollers are in sets and they are positioned longitudinally on each side of the seals.

* * * * *